US008631314B2

(12) United States Patent
Lee et al.

(10) Patent No.: US 8,631,314 B2
(45) Date of Patent: Jan. 14, 2014

(54) SYSTEMS AND METHODS FOR DELIVERY OF MULTIPLE ONLINE ADVERTISING UNITS TO COMMUNICATE AND INTERACT ON THE SAME WEBPAGE (75) Inventors: Hyo Lee, Pasadena, CA (US); Peter H. Kim, Pasadena, CA (US)

(73) Assignee: Interpols Network Incorporated, Pasadena, CA (US)

( * ) Notice: Subject to any disclaimer, the term of this patent is extended or adjusted under 35 U.S.C. 154(b) by 1349 days.

(21) Appl. No.: 11/750,872

(22) Filed: May 18, 2007

(65) Prior Publication Data
US 2007/0276732 A1    Nov. 29, 2007

Related U.S. Application Data (60) Provisional application No. 60/747,637, filed on May 18, 2006.

(51) Int. Cl.
*G06Q 30/00* (2012.01)
*G06F 3/14* (2006.01)

(52) U.S. Cl.
USPC ........... 715/203; 715/205; 715/208; 715/234; 715/240; 715/250; 715/760; 715/764; 715/804; 705/14.43; 705/14.49; 705/14.55

(58) Field of Classification Search
USPC ......... 715/205, 208, 234, 240, 243, 248, 250, 715/760, 764, 804; 705/14.43, 14.49, 14.55
See application file for complete search history.

(56) References Cited

U.S. PATENT DOCUMENTS

| | | | | |
|---|---|---|---|---|
| 6,339,438 B1 * | 1/2002 | Bates et al. | | 715/787 |
| 6,430,568 B1 * | 8/2002 | Hickey et al. | | 1/1 |
| 2002/0053078 A1 * | 5/2002 | Holtz et al. | | 725/14 |
| 2003/0208560 A1 * | 11/2003 | Inoue et al. | | 709/219 |
| 2004/0054589 A1 * | 3/2004 | Nicholas et al. | | 705/14 |
| 2005/0086105 A1 | 4/2005 | McFadden et al. | | |
| 2005/0216342 A1 * | 9/2005 | Ashbaugh | | 705/14 |
| 2006/0123038 A1 | 6/2006 | Fenton et al. | | |
| 2007/0027756 A1 * | 2/2007 | Collins et al. | | 705/14 |

OTHER PUBLICATIONS

International Search Report of PCT/US08/81367.

* cited by examiner

*Primary Examiner* — Stephen Hong
*Assistant Examiner* — Wilson Tsui
(74) *Attorney, Agent, or Firm* — Procopio, Cory, Hargreaves & Savitch LLP; Noel C. Gillespie (57) ABSTRACT A system for delivering advertisement units that interact with each other on a webpage is disclosed. The system includes a web browser, a web server, and an advertisement server. The web browser is configured to generate a request for a webpage. The web server is communicatively connected to the web browser and is configured to receive the request for a webpage from the web browser and send the requested webpage to the browser in response to the request. The webpage includes an ad unit request script that is configured to direct the web browser to generate a request for an advertisement unit.

The advertisement server is communicatively connected to the web browser and the web server. The advertisement server is configured to receive advertisement unit requests and send a first ad unit and a second ad unit to the web browser in response to those requests. The first and second ad units are rendered by the web browser onto the webpage. The first ad unit is communicatively interfaced with the second ad unit and is configured to detect the second ad unit and send instructions to the second ad unit if the second ad unit possesses specified attributes. The second ad unit is configured to receive and execute instructions received from the first ad unit.

26 Claims, 6 Drawing Sheets

SYSTEMS AND METHODS FOR DELIVERY OF MULTIPLE ONLINE ADVERTISING UNITS TO COMMUNICATE AND INTERACT ON THE SAME WEBPAGE

APPLICATIONS FOR CLAIM OF PRIORITY

This application claims the benefit of U.S. Provisional Application No. 60/747,637 filed May 18, 2006. The entirety of the disclosure of the above-identified application is incorporated herein by reference.

BACKGROUND

I. Field of the Invention

The embodiments disclosed in this application generally relate to Internet advertising and more specifically to Internet advertising and techniques for allowing multiple Internet advertising units rendered on the same webpage to communicate and interact.

2. Background of the Invention

With the proliferation of advertising on the Internet and the resulting marketing overload experienced by many Internet users, it is becoming increasingly important for Internet ad units to differentiate themselves from "rest of the crowd." Rich-media ads are becoming the norm as they can deliver content that is animated, makes sounds, interacts with users, etc. Correspondingly, Internet marketing schemes have become more elaborate and sophisticated, sometimes involving multiple ad units being delivered for simultaneous viewing by a user.

Most Internet advertising units are self-contained entities on the webpage that they're rendered on. When multiple (2 or more) ad units are rendered on the same webpage, the units can be made to behave like they are interacting with each other by playing pre-scripted timed animation or by hard coding the ad units such that they require web publishers to serve them together on the same webpage at the same time to ensure proper functionality. This level of programming or pre-scheduling by the web publisher significantly limits their flexibility in creating complex advertising schemes that utilize multiple ad units that are non-synchronously rendered on a webpage.

SUMMARY

Systems and methods for multiple advertisement units to communicate and interact with each other on a webpage are disclosed.

In one aspect, a system for providing advertisement units that communicate and interact with each other on a webpage is disclosed. The system includes a web browser, a web server, and an advertisement server. The web browser is configured to generate a request for a webpage. The web server is communicatively connected to the web browser and is configured to receive the request for a webpage from the web browser and send the requested webpage to the browser in response to the request. The webpage includes an ad unit request script that is configured to direct the web browser to generate a request for an advertisement unit.

The advertisement server is communicatively connected to the web browser and the web server. The advertisement server is configured to receive advertisement unit requests and send a first ad unit and a second ad unit to the web browser in response to those requests. The first and second ad units are rendered by the web browser onto the webpage. The first ad unit is communicatively interfaced with the second ad unit and is configured to detect the second ad unit and send instructions to the second ad unit if the second ad unit shares common attributes with the first ad unit. The second ad unit is configured to receive and execute instructions received from the first ad unit.

In a different aspect, a method for multiple ad units rendered on a webpage to communicate and interact is disclosed. An ad unit is delivered to a webpage rendered by a web browser. A determination is made regarding whether the webpage already has a main ad unit that shares common attributes with the ad unit. If the webpage has a main ad unit that shares common attributes with the ad unit, the ad unit is converted to an auxiliary ad unit. The auxiliary ad unit is rendered on the webpage and then registered with the main ad unit. Instructions are received from the main ad unit. The instructions received from the main ad unit are executed.

In another aspect, a system for multiple ad units to communicate and interact with each other is disclosed. A first ad unit is rendered on the webpage and configured to be programmed by a user. A second ad unit is rendered on the webpage. The second ad unit shares common attributes with the first ad unit and is communicatively interfaced with the first ad unit. The second ad unit is configured to receive and execute instructions from the first ad unit.

These and other features, aspects, and embodiments of the invention are described below in the section entitled "Detailed Description."

BRIEF DESCRIPTION OF THE DRAWINGS

For a more complete understanding of the principles disclosure herein, and the advantages thereof, reference is now made to the following descriptions taken in conjunction with the accompanying drawings, in which.

DETAILED DESCRIPTION

An invention is described for systems and methods for multiple advertisement units to communicate and interact with each other on a webpage. It will be obvious, however, that the present invention may be practiced without some or all of these specific details. In other instances, well known process operations have not been described in detail in order not to unnecessarily obscure the present invention.

As used herein, the Internet or World Wide Web (WWW) uses a hypermedia (i.e., comprising of graphics, audio, video, plain text, hyperlinks, etc.) based system for enabling the browsing of Internet sites. As its name implies, the WWW (i.e., Internet) is comprised of many websites linked together allowing users to travel from one website to another simply by clicking on hyperlinks. To access the web, a user (i.e., client) typically runs a web browser program (e.g., FIREFOX™, NETSCAPE™, INTERNET EXPLORER™, SAFARI™, OPERA™, CAMINO™, etc.) that assists the user in navigating from among the various websites on the WWW and renders the web pages associated with those websites for viewing by the user.

Webpages are typically written in HyperText Markup Language (HTML), Dynamic HyperText Markup Language (DHTML) or Extensible HyperText Markup Language (XHTML). DHTML denotes a collection of technologies used together to create interactive and animated web sites by using a combination of a static markup language (i.e., HTML), a client-side scripting language (such as JAVASCRIPT™), a presentation definition language (i.e., CSS), and a Document Object Model. DHTML based webpages use client-side scripting to change the variables of the presentation definition language (i.e., HTML) to affect the look and function of otherwise "static" HTML page content, after the page has been fully loaded and during the rendering process.

Internet advertisements can take any form as along as it can be rendered onto a web browser or equivalent application. Examples include: static graphical banners, interactive polls, interactive games, multimedia clips, streaming video, etc. Rich-media denotes interactive multimedia web content that includes audio, graphics, image, video and animation in addition to traditional media (text and graphics).

In view of the foregoing, it should therefore be fully appreciated that a variety of Internet advertising content (e.g., animated ads, interactive polls, multi-media ads, etc.) can benefit from the systems and methods described herein.

Figure 1:
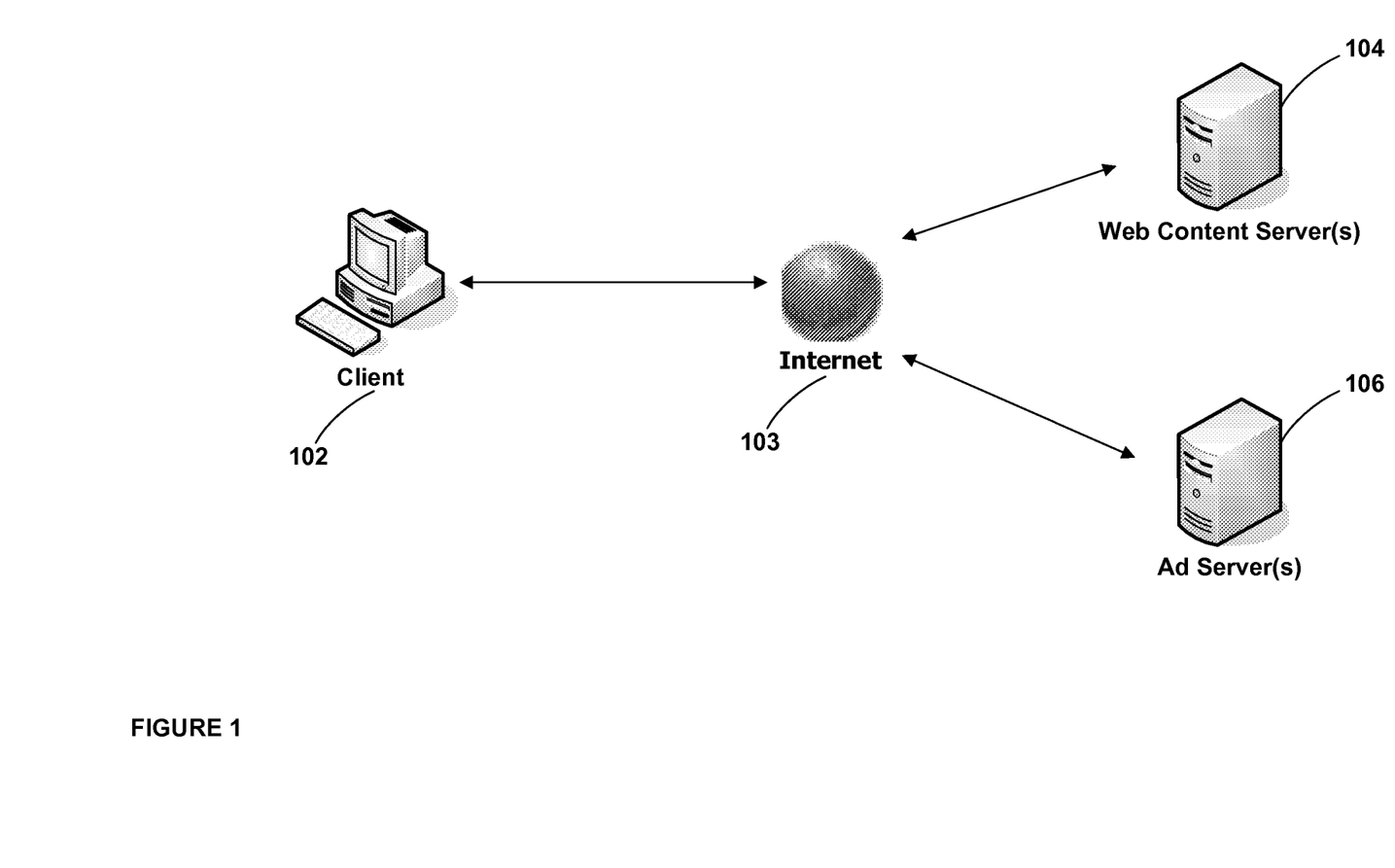
FIG. 1, is a block diagram illustrating a wide area network (WAN) for delivering Internet advertisement units that communicate and interact with each other on a webpage, in accordance with one embodiment.

FIG. 1, is a block diagram illustrating a wide area network (WAN) for delivering Internet advertisement units that interact with each other on a webpage in accordance with one embodiment. As depicted, the system includes a client 102 (hosting a web browser) that is in communications by way of the Internet 103 with a web content server 104, and an ad server 106. It should be appreciated that the client 102 can be in communications with multiple servers of each server type (e.g., web content server 104, ad server 106, etc.) and that single servers were used in this depiction for the sake of simplicity and is not intended to limit the scenario to single servers of each server type.

During an Internet 103 web surfing session, the client 102 makes a request for a web page from the web content server 104, which is configured to send the requested page back to the client 103 in the form of a Hypertext Markup Language (HTML) or equivalent file type (e.g., Extensible Markup Language (XML), Extensible Hypertext Markup Language (XHTML), and Extensible Bindings Language (XBL)). Embedded within the web page is a script that instructs the clients' 102 web browser to send a request for advertisement units to be sent from the ad server 106 to the client 102. Examples of programming languages that can be used to create the script include, JAVASCRIPT™, VBSCRIPT™, and ACTIONSCRIPT™. It should be understood, however, that the script can be created using any programming language as long as it can be processed by the client's 102 web browser to initiate a request for an advertisement panel from the ad server 106.

Continuing with FIG. 1, once the script is delivered to the ad server 106, the Internet ad unit is generated and then returned to the web browser. There it is rendered onto or as part of the webpage by the web browser. The Internet ad unit is configured to detect, register and interact with other Internet ad units that have already been rendered on the same webpage and share the same common attributes. In one embodiment, the common attributes are that the Internet ad units share the same ad campaign objectives. That is, the ad units are geared towards the same marketing objectives. For example, the ad units may all be geared towards getting Internet users to visit a website that is selling product "A." Therefore, a first ad unit may have a banner ad relating to product "A," a second ad unit may play streaming video about the same product, while a third ad unit may present polls asking users to rate features they would like product "A" to have.

In another embodiment, the common attributes are that the Internet ad units share the same client. For example, all the Internet ad units may share Company "A" as a common client. Alternatively, a first Internet ad unit may relate to Subsidiary "A," while a second Internet ad unit may relate to Subsidiary "B", both subsidiaries "A" and "B" belonging to Company "A."

In still another embodiment, the common attributes are that the Internet ad units relate to the same client type. For example, the ad units may all relate to clients in the same industry (i.e., automotive industry), industry sub-segment (e.g., automotive parts, automotive repair, car dealerships, etc.), or other common trait (e.g., clients who cater to selected professionals, demographics, genders, etc.). In a different embodiment, the common attributes are that the Internet ad units relate to certain custom features within the ad units. For example, these ad units can be setup in any arbitrary way for them to be connected with other ads. That is, the common attributes can be that the ads have a combination of the same clients, same advertising campaign or interact simply because they happen to be served onto a same page. Essentially any detectable ad feature can be mixed and matched as common attributes.

It should be appreciated, however, that these are just examples of some common shared attributes between Internet ad units and that the shared attributes can essentially be any characteristic as long as it can be recognized by programmable logic infused into the ad units. That is, essentially any arbitrary condition can be programmed into the main ad units and auxiliary ad units for them to flag and recognize each other. For example, the "master" unit can be configured to specifically seek out a particular "slave" unit with particular questions and have the master unit completely change the look and feel of the slave unit.

In one embodiment, when multiple ad units are rendered on the same webpage, they are each classified as either a "main" ad unit or an "auxiliary" ad unit. A main ad unit is configured to be programmed with specific ad campaign goals and objectives so that it can generate and send instructions to the auxiliary ad units to implement those objectives. Additionally, the main ad unit is configured such that it can generate and send instructions to the auxiliary ad units based on how a user interacts it. That is, the main ad unit can determine what actions by the auxiliary ad units are necessary based on the ad campaign objectives entered by a system administrator and/or interactivity with a user; then, generate and communicate the appropriate instructions to the auxiliary ad units.

Still with FIG. 1, typically, there is only one main ad unit per each class of Internet ad units with the same shared attributes. For example, there may be several groups of ad units each having a different class of shared attributes (e.g., shared client, shared marketing objectives, shared subject matter, etc.) that may be rendered on a webpage. But for each of the groups of ad units, only one of the ad units can be designated a main ad unit, while the rest of the ad units in the group are designated as auxiliary ad units.

The auxiliary ad units are configured to detect the presence of a rendered main ad unit on a webpage, register itself with the main ad unit and make itself available for communication and control by the same. That is, the auxiliary ad units serve a subservient role to the main ad unit by taking instructions from the same.

In one embodiment, the instructions generated by the main ad unit are imbedded with messaging, images, rich media content and technical features that are designed to enhance the utility of the auxiliary ad units. Examples of the types of rich-media content that can be embedded in the instructions include, but are not limited to, streaming video, questions, data forms, coupons, multiple universal resource locators (URLs), XML feeds, and other advanced features that can be implemented in HTML. It should be appreciated, however, that essentially any technical feature and/or content type can be imbedded into the instructions and communicated to the auxiliary ad units as long as it can be rendered on a webpage.

The auxiliary ad units do not have to be pre-scripted. Programming code, such as JAVASCRIPT™, VBSCRIPT™, and ACTIONSCRIPT™, can be used to inject new code into the auxiliary ad units and completely replace their original functionality. For example, the questions on the auxiliary ad unit can be changed, the auxiliary ad unit can be changed into some other type (e.g., banner, video feed, etc.) of ad unit, the auxiliary ad can be turned into an expandable unit, etc. It should be understood, that the auxiliary ad units may modified to take any form or functionality as long as the web browser hosting the ad can be configured to render the same.

In one embodiment, the auxiliary ad units are configured to send messages back to the main unit on user interaction to transform or adjust the main ad unit's behavior. That is, auxiliary ad units can communicate bi-directionally with all the other units (i.e., main and auxiliary ad units) that are rendered on the webpage. This adds an additional layer of interactions and interdependencies between the rendered ad units.

Figure 2:
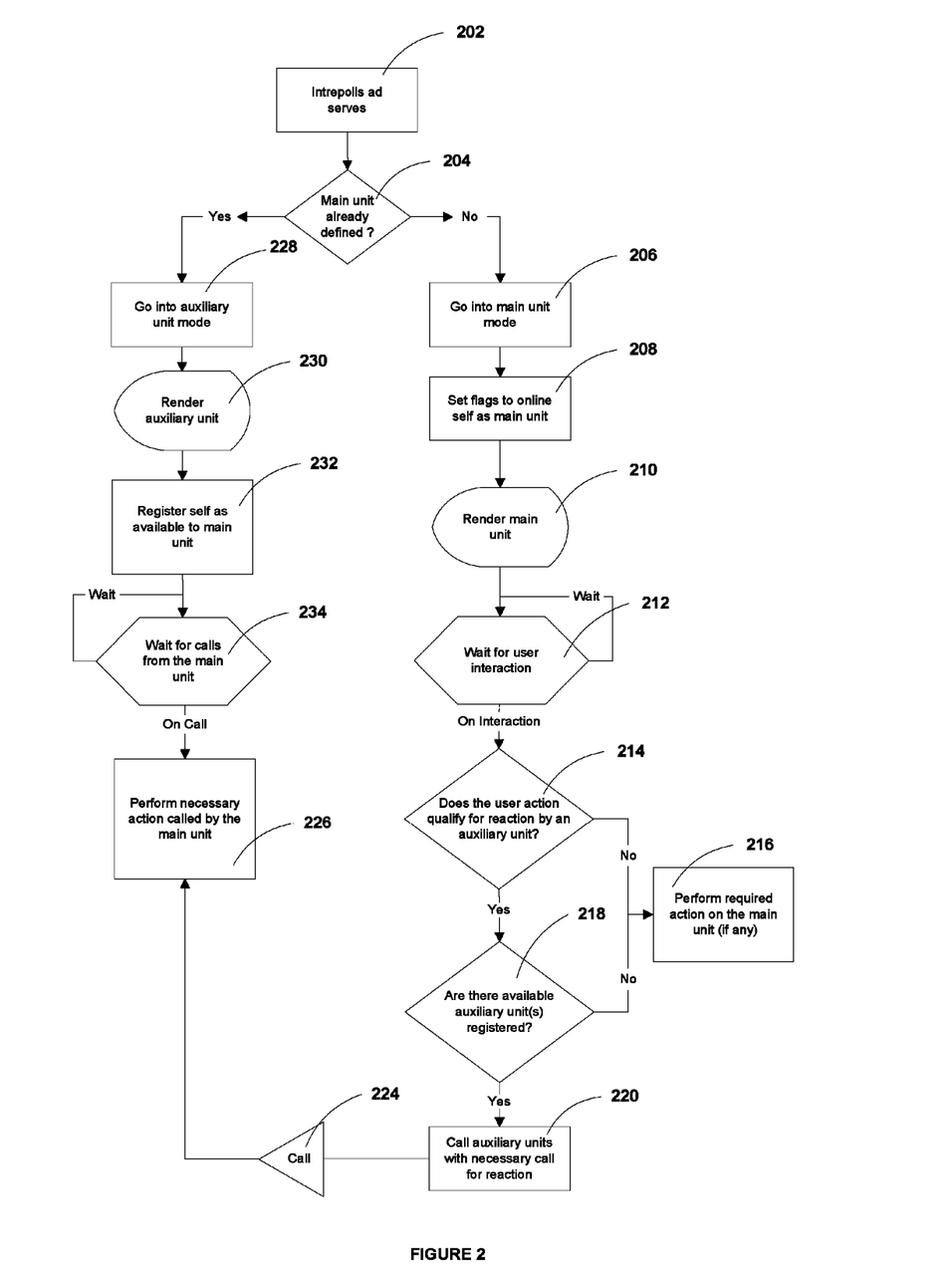
FIG. 2 is a diagram illustrating an example process for Internet ad units to communicate and interact with each other on the same webpage, in accordance with one embodiment.

FIG. 2 is a diagram illustrating an example process for Internet ad units to communicate and interact with each other on the same webpage, in accordance with one embodiment. In step 202, an ad unit is served by the ad server to a client's web browser via a TCP/IP-based Internet connection using a Hypertext Transfer Protocol (HTTP) or equivalent communications transmission protocol. In step 204, the ad unit is configured to detect whether a main ad unit has already been defined on the webpage. That is, the ad unit actively looks to see if there are any other rendered ad units on the webpage that shares common attributes with it and have been designated as a main ad unit. In one embodiment, the common attributes are that the Internet ad units share the same ad campaign objectives. For example, the ad units may all be geared towards getting Internet users to visit a website that is selling product "A." Therefore, a first ad unit may have a banner ad relating to product "A," a second ad unit may play streaming video about the same product, while a third ad unit may present polls asking users to rate features they would like product "A" to have.

In another embodiment, the common attributes are that the Internet ad units share the same client. For example, all the Internet ad units may share Company "A" as a common client. Alternatively, a first Internet ad unit may relate to Subsidiary "A," while a second Internet ad unit may relate to Subsidiary "B", both subsidiaries "A" and "B" belonging to Company "A." In still another embodiment, the common attributes are that the Internet ad units relate to the same client type. For example, the ad units may all relate to clients in the same industry (i.e., automotive industry), industry sub-segment (e.g., automotive parts, automotive repair, car dealerships, etc.), or other common trait (e.g., clients who cater to selected professionals, demographics, genders, etc.).

In a different embodiment, the common attributes are that the Internet ad units relate to certain custom features within the ad units. For example, these ad units can be setup in any arbitrary way for them to be connected with other ads. That is, the common attributes can be that the ads have a combination of the same clients, same advertising campaign or interact simply because they happen to be served onto a same page. Essentially any detectable ad feature can be mixed and matched as common attributes. It should be appreciated, however, that these are just examples of some common shared attributes between Internet ad units and that the shared attributes can essentially be any characteristic as long as it can be recognized by programmable logic infused into the ad units. That is, essentially any arbitrary condition can be programmed into the main ad units and auxiliary ad units for them to flag and recognize each other. For example, the "master" unit can be configured to specifically seek out a particular "slave" unit with particular questions and have the master unit completely change the look and feel of the slave unit.

Continuing with FIG. 2, if a main ad unit has not been already rendered, the process proceeds to step 206 where the ad unit is configured to automatically convert itself into the main ad unit by setting "flags" in step 208 to define itself as the main ad unit for the webpage. In one embodiment, those flags are HTML based tags that identify the ad unit as a main ad unit to other ad units. In another embodiment, those flags are XML based tags that identify the ad unit as a main ad unit to other ad units.

In step 210, the newly "tagged" main ad unit is rendered onto the webpage that is currently open in the web browser. In step 212, the rendered main ad unit switches into a "wait" mode whereby it suspends further action until a user interacts with it in some fashion. This may be through a user placing a mouse pointer over the main ad unit and clicking on the main ad unit. Or, it may involve the user submitting information to the main ad unit through the addition of text or the clicking of buttons rendered on the main ad unit.

Once a user interacts with the ad unit, the process proceeds to step 214, where the main ad unit determines if the user action qualifies for some reaction by an auxiliary unit. If not, the process proceeds to step 216 where the main ad unit performs any required action resulting from the user interaction with the main ad unit. If the user action qualifies some action by an auxiliary unit, the process proceeds to step 218 where the main ad unit determines if there are any available auxiliary units that are registered with the main ad unit. That is, first, the main ad unit determines whether there are any auxiliary ad units that are registered to it and, second, whether any of those registered auxiliary ad units are available. If there are not any available registered auxiliary ad units, the process proceeds back to step 216 where the main ad unit performs any required action resulting from the user interaction. If there are available registered ad units, the process proceeds to step 220, where the main ad unit is configured to generates calls that contain the appropriate sets of instructions to select designated auxiliary ad units.

These instructions are imbedded with messaging, images, rich media content and technical features that are designed to enhance the utility of the auxiliary ad units. Examples of the types of rich-media content that can be embedded in the instructions include, but are not limited to, streaming video, questions, data forms, coupons, multiple universal resource locators (URLs), XML feeds, and other advanced features that can be implemented in HTML. It should be appreciated, however, that essentially any technical feature and/or content type can be imbedded into the instructions and communicated to the auxiliary ad units as long as it can be rendered on a webpage.

In step 224, the calls are communicated by the main ad units to the designated auxiliary ad units. In step 226, the auxiliary ad units perform the necessary actions called for by the sets of instructions sent by the main ad unit.

Staying with FIG. 2, if a main ad unit has already been rendered, the process proceeds to step 228 where the ad unit automatically converts itself into auxiliary unit mode. That is, the ad unit takes on the role of an auxiliary ad unit. In step 230, the newly converted auxiliary ad unit is rendered on the webpage by the web browser. In step 232, the auxiliary ad unit registers itself as "available" to the main ad unit with which it shares the same common attributes with. In step 234, the newly registered auxiliary ad unit switches into a "wait" mode whereby it suspends further action until it receives a call from the main ad unit it is registered with at which time the process proceeds to step 226. In step 226, the auxiliary ad unit perform the necessary actions called for by the sets of instructions sent by the main ad unit.

Figure 3A:
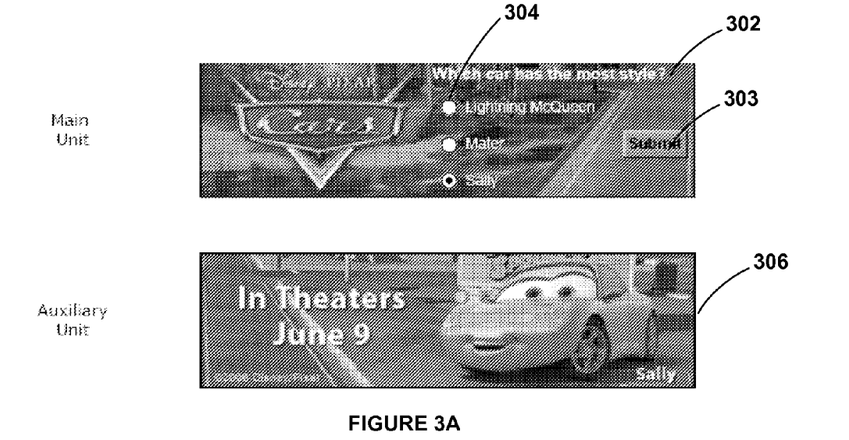
FIG. 3A is an illustration that provides an example of how a main ad unit communicates and interacts with an auxiliary ad unit on a webpage, in accordance with one embodiment.
Figure 3B:
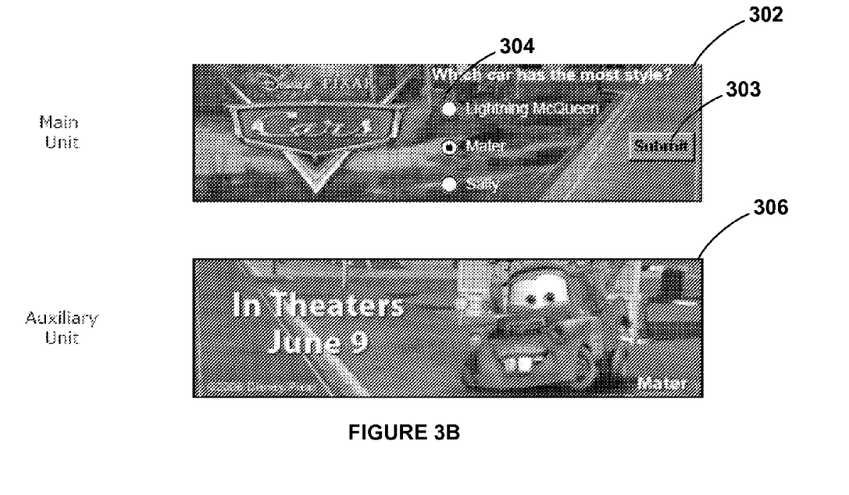
FIG. 3B is an illustration that provides another example of how a main ad unit communicates and interacts with an auxiliary ad unit on a webpage, in accordance with one embodiment.

FIGS. 3A and 3B provides an example of how a main ad unit communicates and interacts with an auxiliary ad unit on a webpage, in accordance with one embodiment. As depicted in FIG. 3A, the main ad unit 302 has a list of checkboxes 304 that allows users to choose ("Which car has the most style?"). Upon selection, the checkboxes 304 are marked appropriately and the user can click the "submit" button 303 to input their preference. Upon submission of the selection, the main ad unit 302 is configured to generate and communicate instructions to the auxiliary ad unit 306 that is registered to it. Once the auxiliary ad unit 306 receives the instructions it is configured to execute those instructions. As shown in FIG. 3A, the auxiliary ad unit 306 changes to a banner ad that depicts the car model (i.e., the "Sally" character) selected by the user.

FIG. 3B, depicts what happens when a user selects a different checkbox (the "Mater" character checkbox) 304 on the main ad unit 302. As depicted, the auxiliary ad unit 306 changes the banner ad to show the "Mater" character selected by the user. The same interaction between the main ad unit 302 and the auxiliary ad unit 306 will occur regardless of which checkbox is chosen by the user.

In one embodiment, instead of a list of checkboxes 304, a query field is provided by the main ad unit 302 to the user. For example, the main ad unit 302 may allow the user to submit a query for specific content (i.e., movie clips, graphics, text content, etc.) from an advertiser associated with the main ad unit 302. The results of the query can then be displayed on the auxiliary ad unit 306 registered to the main ad unit 302. In another embodiment, the main ad unit 302 is configured to render an interactive game that is responsive to user interactions. For example, when a user interacts with the game on the main ad unit 302, depending on the nature of the interaction, the main ad unit 302 can send appropriate instructions to the auxiliary ad unit 306 registered to the main ad unit. The auxiliary ad unit 306 can then execute and display the actions provided for in the instructions. It should be understood, however, that these are but just some examples of how a main ad unit 302 and auxiliary ad unit 306 may interact with each other and that these interactions can take any form as long as the main ad unit 302 can be configured to generate executable instructions that lay out the interactions to the auxiliary ad units 306 (registered to the main ad unit 302).

Figure 4:
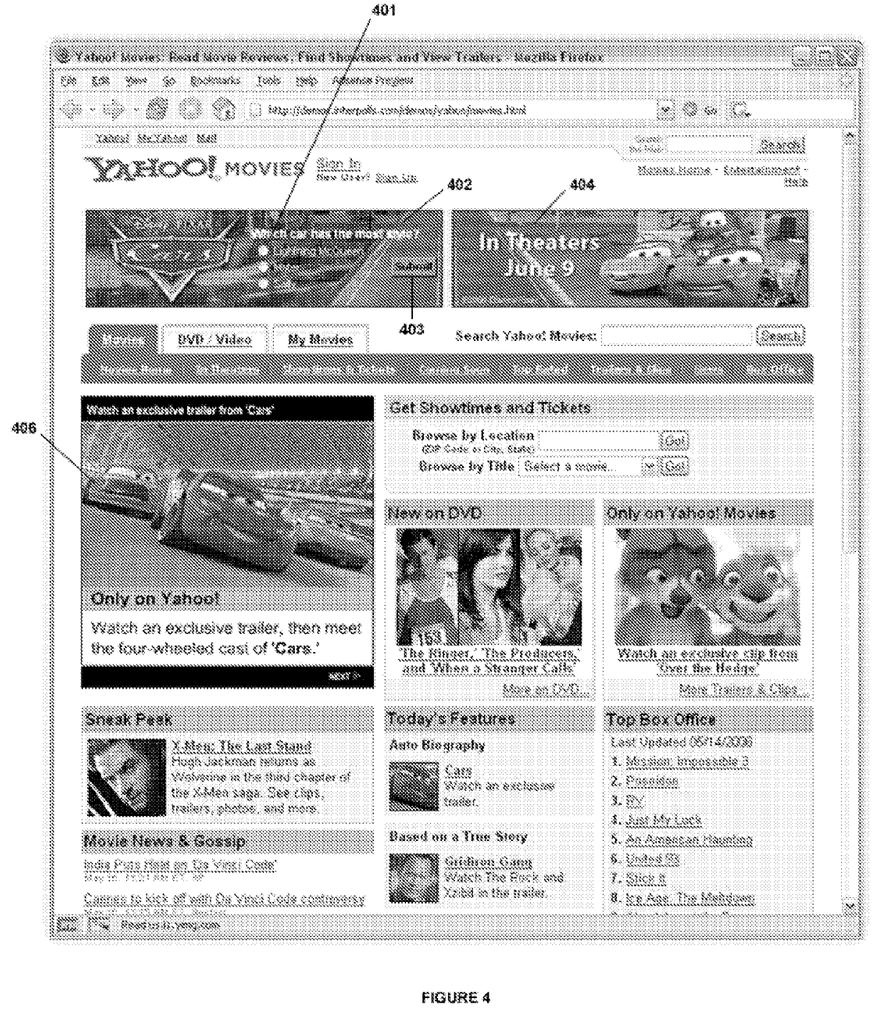
FIG. 4 is a depiction of how a main ad unit can communicate and interact with multiple auxiliary ad units on a webpage, in accordance with one embodiment.

FIG. 4 is a depiction of how a main ad unit can interact with multiple auxiliary ad units on a webpage, in accordance with one embodiment. As shown, herein, a main ad unit 402, a first auxiliary ad unit 404 and a second auxiliary ad unit 406 is rendered on a webpage. The main ad unit 402 has a list of checkboxes 401 that allows users to choose ("Which car has the most style?"). Upon selection, the checkboxes 401 are marked appropriately and the user can go ahead and click the "submit" button 403 to input their preference. Upon submission of the selection, the main ad unit 402 is configured to generate and communicate instructions to the first auxiliary ad unit 404 and the second auxiliary ad unit 406 that are registered to it. Once the auxiliary ad units (404 and 406) receives the instructions they are configured to execute those instructions.

Figure 5:
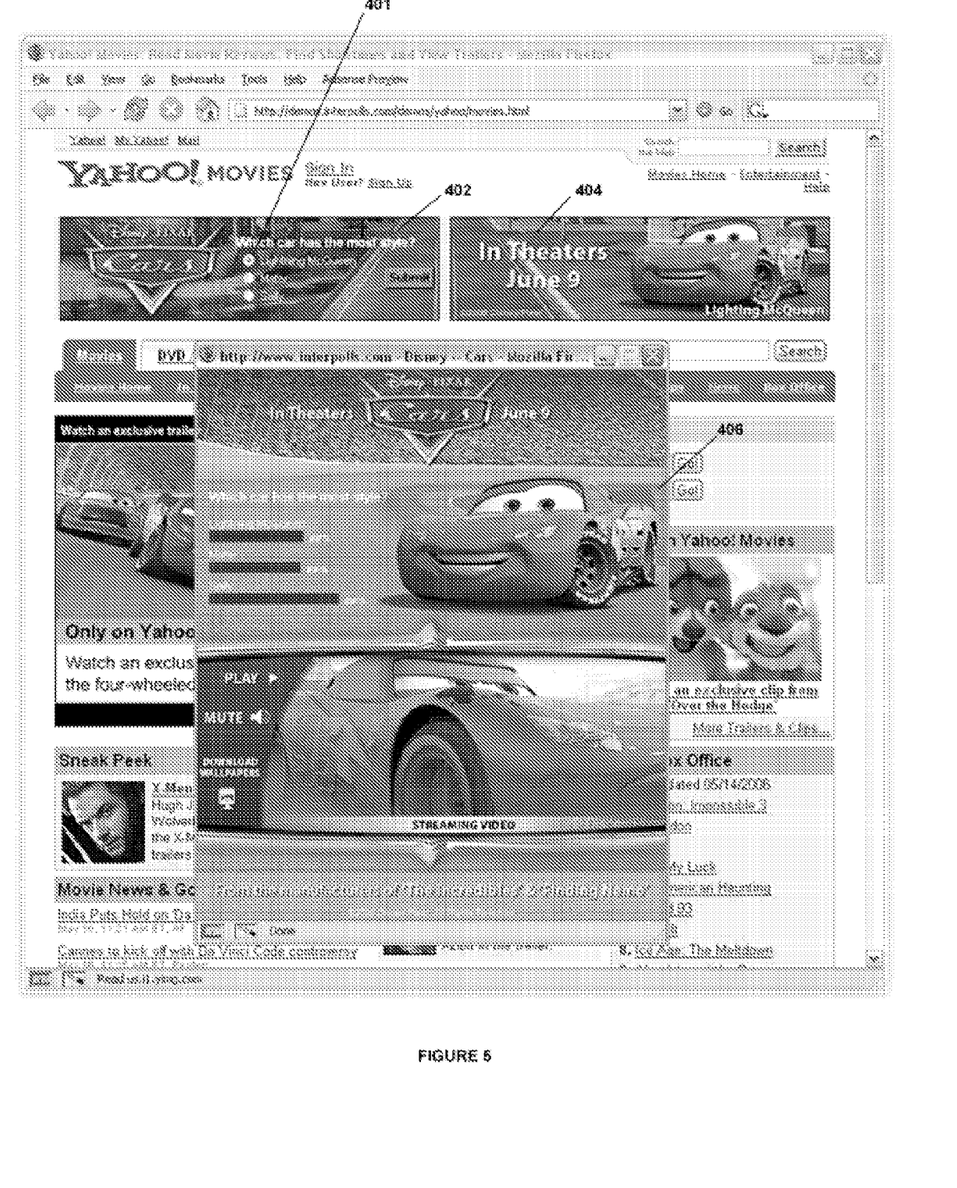
FIG. 5 is a depiction of how multiple auxiliary ad units can respond to instructions received from a main ad unit, in accordance with one embodiment.

For example, as depicted in FIG. 5, the first auxiliary ad unit 404 changes to a banner ad that depicts the car model (i.e., the "Lightening McQueen" character) selected by the user in response to the instructions provided by the main ad unit 402. The second auxiliary ad unit 406 then retrieves aggregate voting results and media clips (e.g., video, audio, graphics) associated with the selected car model (i.e., "Lightening McQueen") from a database server (designated by the main ad unit 402 instructions) and then displays them to the user. These same interactions between the main ad unit 402 and auxiliary ad units (404 and 406) are repeated in FIG. 6, when the user selects "Mater" as the selected car model on the main ad unit 402.

Figure 6:
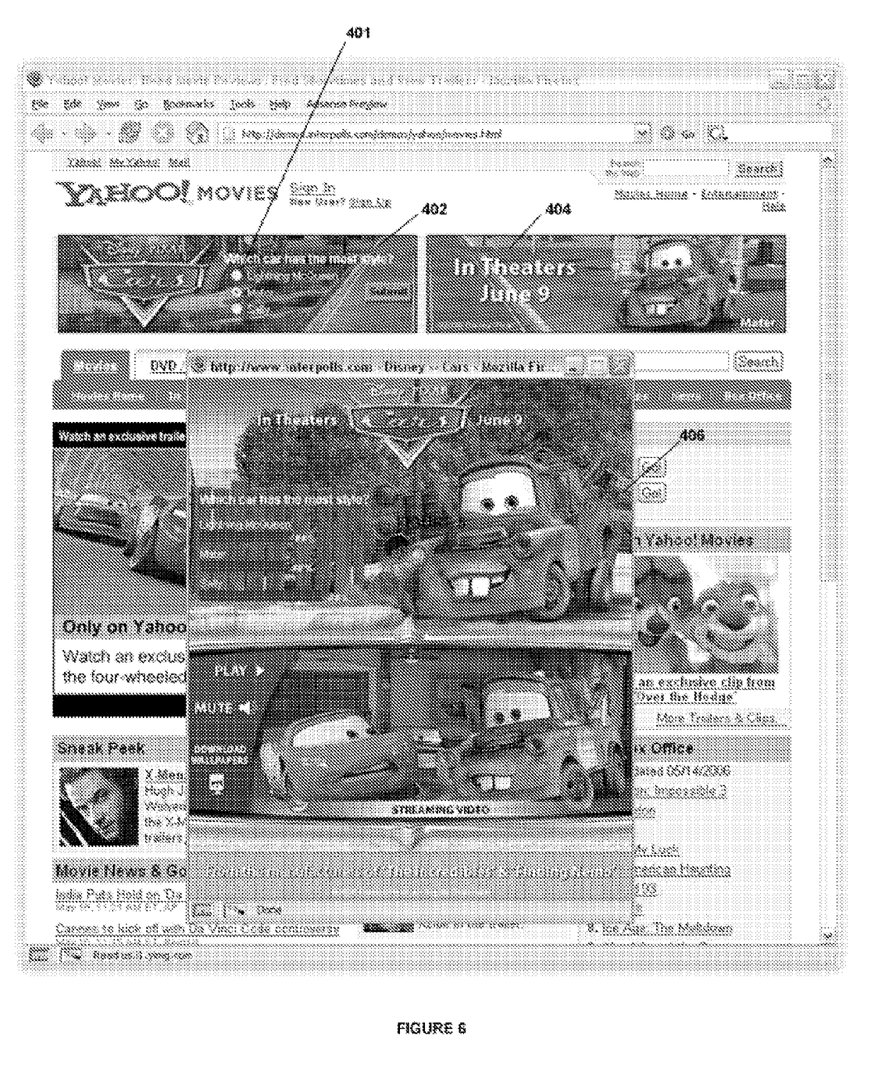
FIG. 6 is another depiction of how multiple auxiliary ad units can respond to instructions received from a main ad unit, in accordance with one embodiment.

It should be appreciated that the interactions between three ad units (402, 404 and 406) were shown here by way of example only. In practice, the same underlying communications and interactive principles between ad units can be replicated for as many ad units as can be rendered on a webpage. That is, the main ad unit 402 can be configured to accommodate as many auxiliary ad units (404 and 406) as can be rendered on a webpage.

Any of the operations that form part of the embodiments described herein are useful machine operations. The invention also relates to a device or an apparatus for performing these operations. The systems and methods described herein can be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The embodiments described herein can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Certain embodiments can also be embodied as computer readable code on a computer readable medium. The computer readable medium is any data storage device that can store data, which can thereafter be read by a computer system.

Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed is:

1. A system for delivering advertisement units that communicate and interact with each other on a webpage, comprising:
   a computer readable medium containing instructions which, when executed by a computer, cause a web browser to generate a request for a webpage;
   a website server communicatively connected-to the web browser, the website server configured to receive the webpage request from the web browser and send the webpage to the web browser in response to the webpage request, wherein the webpage includes an ad unit request script configured to direct the web browser to generate a request for the advertisement unit; and
   an advertisement server communicatively connected to the web browser and the web publishing server, the advertisement server configured to receive advertisement unit requests and send a first ad unit and a second ad unit to the web browser, wherein,
   the first ad unit and the second ad unit are rendered by the web browser onto the web page,
   the first ad unit is communicatively interfaced with the second ad unit and configured to communicate with the second ad unit and send instructions to the second ad unit if it is detected at the computer that the second unit shares common attributes with the first ad unit, and
   the second ad unit is configured to receive and execute instructions received from the first ad unit.

2. The system for delivering advertisement units that interact with each other on a webpage, as recited in claim 1, wherein the first ad unit is designated a main ad unit.

3. The system for delivering advertisement units that interact with each other on a webpage, as recited in claim 1, wherein the second ad unit is designated an auxiliary ad unit.

4. The system for delivering advertisement units that interact with each other on a webpage, as recited in claim 1, wherein additional rich media content can be imbedded in the instructions.

5. The system for delivering advertisement units that interact with each other on a webpage, as recited in claim 4, wherein the rich media content includes graphics.

6. The system for delivering advertisement units that interact with each other on a webpage, as recited in claim 4, wherein the rich media content includes XML feeds.

7. The system for delivering advertisement units that interact with each other on a webpage, as recited in claim 4, wherein the rich media content includes streaming video content.

8. The system for delivering advertisement units that interact with each other on a webpage, as recited in claim 4, wherein the rich media content includes interactive polls.

9. The system for delivering advertisement units that interact with each other on a webpage, as recited in claim 1, wherein the first ad unit is configured to be programmed with ad campaign objectives.

10. The system for delivering advertisement units that interact with each other on a webpage, as recited in claim 9, wherein the first ad unit is configured to interpret the ad campaign objectives and tailor the instructions to the second ad unit to implement the ad campaign objectives.

11. The system for delivering advertisement units that interact with each other on a webpage, as recited in claim 1, wherein the specified attributes includes the first ad unit and the second ad unit belonging to the same ad campaign.

12. The system for delivering advertisement units that interact with each other on a webpage, as recited in claim 1, wherein the specified attributes includes the first ad unit and the second ad unit advertising products of the same client.

13. The system for delivering advertisement units that interact with each other on a webpage, as recited in claim 1, wherein the specified attributes includes the first ad unit and the second ad unit relating to the same subject matter.

14. A system for multiple ad units to communicate and interact with each other on a webpage, comprising:
   a processor; and
   a memory module coupled to the processor, the memory module containing instructions which, when executed by the processor, cause a first ad unit and a second ad unit to be rendered on the webpage, the first ad unit configured to receive input from a user;
   wherein the first ad unit is configured to communicate with detect the second ad unit and send instructions to the second ad unit if it is detected that the second ad unit shares common attributes with the first ad unit, and wherein the second ad unit is configured to receive and execute the instructions from the first ad unit.

15. The system for multiple ad units to communicate and interact with each other on a webpage, as recited in claim 14, wherein additional rich media content can be imbedded in the instructions.

16. The system for multiple ad units to communicate and interact with each other on a webpage, as recited in claim 15, wherein the rich media content includes graphics.

17. The system for multiple ad units to communicate and interact with each other on a webpage, as recited in claim 15, wherein the rich media content includes XML feeds.

18. The system for multiple ad units to communicate and interact with each other on a webpage, as recited in claim 15, wherein the rich media content includes streaming video content.

19. The system for multiple ad units to communicate and interact with each other on a webpage, as recited in claim 15, wherein the rich media content includes interactive polls.

20. The system for multiple ad units to communicate and interact with each other on a webpage, as recited in claim 14, wherein the first ad unit is configured to be programmed with ad campaign objectives.

21. The system for multiple ad units to communicate and interact with each other on a webpage, as recited in claim 14, wherein the first ad unit is configured to interpret the ad campaign objectives and tailor the instructions to the second ad unit to implement the ad campaign objectives.

22. The system for multiple ad units to communicate and interact with each other on a webpage, as recited in claim 14, wherein the shared attributes include the first ad unit and the second ad unit belonging to the same ad campaign.

23. The system for multiple ad units to communicate and interact with each other on a webpage, as recited in claim 14, wherein the shared attributes include the first ad unit and the second ad unit advertising products of the same client.

24. The system for multiple ad units to communicate and interact with each other on a webpage, as recited in claim 14, wherein the shared attributes include the first ad unit and the second ad unit relating to the same subject matter.

25. The system for multiple ad units to communicate and interact with each other on a webpage, as recited in claim 14, wherein the first ad unit is designated as a main ad unit.

26. The system for multiple ad units to communicate and interact with each other on a webpage, as recited in claim 14, wherein the second ad unit is designated as an auxiliary ad unit.

* * * * *